(12) United States Patent
Shin et al.

(10) Patent No.: US 11,156,896 B2
(45) Date of Patent: Oct. 26, 2021

(54) AUGMENTED REALITY DEVICE

(71) Applicant: SAMSUNG ELECTRONICS CO., LTD., Suwon-si (KR)

(72) Inventors: Bongsu Shin, Seoul (KR); Hongseok Lee, Seoul (KR); Changkun Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 16/841,149

(22) Filed: Apr. 6, 2020

(65) Prior Publication Data
US 2021/0132463 A1 May 6, 2021

(30) Foreign Application Priority Data
Oct. 31, 2019 (KR) .......................... 10-2019-0138195

(51) Int. Cl.
*G02F 1/29* (2006.01)
*G06T 19/00* (2011.01)
*G02B 27/01* (2006.01)

(52) U.S. Cl.
CPC ......... *G02F 1/292* (2013.01); *G02B 27/0172* (2013.01); *G02B 27/0176* (2013.01); *G06T 19/006* (2013.01)

(58) Field of Classification Search
CPC ......... G06F 3/011; G02B 27/01; G02B 26/08; G02B 27/00; G02B 26/10; G06T 19/006; G09G 5/00; G21V 8/00; H04N 9/31
See application file for complete search history.

(56) References Cited

U.S. PATENT DOCUMENTS

| | | | |
|---|---|---|---|
| 8,839,690 B2* | 9/2014 | Huang | B25J 17/0266 74/490.06 |
| 9,032,831 B2* | 5/2015 | Sutherland | B25J 5/00 74/490.05 |
| 9,983,412 B1 | 5/2018 | Fuchs et al. | |
| 10,107,618 B2* | 10/2018 | Jordil | G01B 5/0004 |
| 10,175,489 B1* | 1/2019 | Robbins | G01S 17/88 |
| 10,228,565 B1* | 3/2019 | Saarikko | G02B 27/0081 |
| 2012/0103124 A1* | 5/2012 | Herder | B25J 9/0051 74/490.01 |
| 2013/0077049 A1 | 3/2013 | Bohn | |
| 2013/0300653 A1 | 11/2013 | Lewis et al. | |

(Continued)

FOREIGN PATENT DOCUMENTS

| | | |
|---|---|---|
| JP | 2016-133629 A | 7/2016 |
| WO | 2006038662 A1 | 4/2006 |

*Primary Examiner* — William Lu
(74) *Attorney, Agent, or Firm* — Sughrue Mion, PLLC

(57) ABSTRACT

An augmented reality (AR) device includes a light source; a light source-moving delta robot on which the light source is mounted, the light source-moving delta robot being configured to change a traveling path of light emitted from the light source by adjusting at least one of a position or a slope of the light source in a three-dimensional (3D) space based on a movement of the light source-moving delta robot; a display device configured to generate a first image by modulating the light emitted from the light source; and a combiner configured to combine the first image generated by the display device with a second image, which is different from the first image and is received from an external source, and output a combined image.

21 Claims, 10 Drawing Sheets

(56) References Cited

U.S. PATENT DOCUMENTS

| | | | |
|---|---|---|---|
| 2014/0313557 A1* | 10/2014 | Brown | G02B 26/085 |
| | | | 359/200.7 |
| 2015/0077312 A1* | 3/2015 | Wang | G02B 27/017 |
| | | | 345/7 |
| 2015/0189266 A1* | 7/2015 | Zhou | G06F 3/04842 |
| | | | 348/54 |
| 2016/0209656 A1 | 7/2016 | Urey | |
| 2016/0320620 A1 | 11/2016 | Maimone | |
| 2016/0320837 A1* | 11/2016 | Swedish | G06K 9/00604 |
| 2016/0368110 A1* | 12/2016 | Lu | B23Q 15/14 |
| 2017/0299860 A1 | 10/2017 | Wall et al. | |
| 2017/0336222 A1* | 11/2017 | Yamaguchi | G01C 21/365 |
| 2018/0038461 A1* | 2/2018 | Salerno | B25J 9/0051 |
| 2018/0150998 A1 | 5/2018 | Thew et al. | |
| 2018/0157317 A1* | 6/2018 | Richter | G06T 19/006 |
| 2018/0182272 A1* | 6/2018 | Mcglew | G02B 26/0833 |
| 2018/0348525 A1* | 12/2018 | Kadowaki | G02B 26/101 |
| 2019/0187482 A1* | 6/2019 | Lanman | G02B 27/0172 |
| 2019/0257912 A1* | 8/2019 | Remelius | G01S 3/782 |
| 2020/0092523 A1* | 3/2020 | Peuhkurinen | H04N 9/3188 |

\* cited by examiner

AUGMENTED REALITY DEVICE

CROSS-REFERENCE TO RELATED APPLICATION

This application claims priority from Korean Patent Application No. 10-2019-0138195, filed on Oct. 31, 2019, in the Korean Intellectual Property Office, the disclosure of which is incorporated herein in its entirety by reference.

BACKGROUND

1. Field

Example embodiments of the present disclosure relate to an augmented reality (AR) device.

2. Description of Related Art

Recently, there have been increasing demands for augmented reality (AR) devices that allow users to visually recognize desired virtual images while viewing real world scenes.

Generally, such an AR device includes a display device that generates a virtual image based on a particular signal and a combiner that allows a user to view the virtual image and a real world scene.

Examples of the display device may include a reflective display device such as a liquid crystal on silicon display (LCoS), a digital micrometer display (DMD), etc. Such a reflective display device may modulate light received from a light source for each pixel to generate a virtual image. The reflective display device may include a flat-type structure. The AR device may need to further include a separate optical system (e.g., a beam splitter (BS)) that guides the light from the light source to the reflective display device. As a result, the volume of the AR device using the reflective display device may increase.

The combiner may include a structure where the BS and the optical system (e.g., a lens, a mirror, etc.) are coupled with each other. However, as a viewing angle increases, the volume of the BS and the optical system also increases, resulting in an increase in the volume of the combiner. Moreover, research has been recently conducted on a holographic optical element (HOE) having complex optical characteristics that may be used in an augmented reality device as a combiner in a simple form.

The combiner using the HOE is configured to execute a function of a concave mirror, such that a focus may be formed to create a virtual image on a pupil position of a user. However, when the HOE is used as a combiner, an eye needs to be accurately positioned onto a very small focus area to view the virtual image, reducing an eye box that is an image-visible range (or a volume within which the user can place his or her pupil to experience the virtual image).

Meanwhile, delta robots are under research and development, these robots being capable of performing various functions through precise and repetitive movements in a small space. A delta robot may make high-speed repetitive movements at a frequency of 75 Hz. Delta robots are applied to surgical robots, robots for product assembly in the industry, etc.

SUMMARY

Provided is an AR device having an eye box that is expanded by using a light source-moving delta robot.

Provided is also an AR device including a light source-moving delta robot, which substitutes for a display device.

According to an aspect of an example embodiment, there is provided an augmented reality (AR) device including: a light source; a light source-moving delta robot on which the light source is mounted, the light source-moving delta robot being configured to change a traveling path of light emitted from the light source by adjusting at least one of a position or a slope of the light source in a three-dimensional (3D) space based on a movement of the light source-moving delta robot; a display device configured to generate a first image by modulating the light emitted from the light source; and a combiner configured to combine the first image generated by the display device with a second image, which is different from the first image and is received from an external source, and output a combined image.

The light source-moving delta robot may include a fixed base; a stage on which the light source is mounted, the stage being spaced apart from the fixed base in a vertical direction; a plurality of leg portions configured to interconnect the fixed base with the stage, each of the plurality of leg portions including at least one joint portion configured to execute a joint movement; and a driving unit configured to independently provide a driving force to each of the plurality of leg portions.

Each of the plurality of leg portions may include a first leg portion and a second leg portion, the first leg portion including at least one first joint portion and the second leg portion including at least one second joint portion.

The driving unit may be further configured to control the at least one first joint portion and the at least one second joint portion to move in directions different from each other.

The plurality of leg portions may include at least three leg portions.

The AR device may further include a sensor configured to sense a position of a pupil of a user.

The AR device may further include a processor configured to control driving of the light source-moving delta robot based on information about the position of the pupil of the user, the information being provided by the sensor.

The AR device may further include a reflective mirror provided between the light source and the display device to reflect the light emitted from the light source toward the display device.

The light source may include an optical element array, in which a plurality of optical element packages are arranged in an array, each of the plurality of optical element packages including optical elements.

The combiner may include a holographic optical element.

According to an aspect of an example embodiment, there is provided an augmented reality (AR) device including: a light source; a light source-moving delta robot on which the light source is mounted, the light source-moving delta robot being configured to generate a first image by repeatedly adjusting at least one of a position or a slope of the light source in a three-dimensional (3D) space based on a movement of the light source-moving delta robot; and a combiner configured to combine the first image generated by the light source-moving delta robot with a second image, which is different from the first image and is received from an external source, and output a combined image.

The combiner may include a beam expander having a first area on which a light from the light source is incident and a second area on which the light from the light source is combined with light from the external source, the beam expander configured to expand an area in which the light from the light source is irradiated.

The beam expander may include a light guide plate including a first surface, on which the light from the light source is incident, and a second surface opposite the first surface; an input grating provided in the first area on the first surface or the second surface of the light guide plate, the input grating being configured to diffract the light from the light source to cause the diffracted light to travel by total reflection inside the light guide plate; and an output grating provided in the second area on the first surface or the second surface of the light guide plate, the output grating being configured to output the light that has travelled inside the light guide plate by the input grating toward an outside of the light guide plate, the second area being spaced from the first area in a horizontal direction of the light guide plate.

The beam expander may include a plurality of beam expanders that are sequentially arranged in a direction.

The AR device may further include an optical conversion lens provided between the light source and the combiner, the optical conversion lens being configured to direct the light from the light source toward the combiner.

The output grating may be configured to output the light that has travelled inside the light guide plate through the second surface.

The output grating may be configured to transmit light of the second image, based on which the first image is combined with the second image in the second area of the beam expander and the combined image travels through the second surface of the light guide plate.

The combiner may include a beam splitter including a first reflecting surface that is inclined with respect to a traveling direction of light from the light source, the first reflecting surface transmitting a first part of the light from the light source and reflecting a second part of the light from the light source; and an optical unit provided on a traveling path of light passing through the first reflecting surface, the optical unit including a second reflecting surface having a curve, and the second reflecting surface reflecting light passing through the beam splitter to direct the reflected light toward the beam splitter.

The light source-moving delta robot may be configured to move along a curved trajectory to correct distortion of the first image caused by the optical unit.

The AR device may further include a display device arranged on a traveling path of light of the second image, the display device being configured to transmit the light of the second image, generate a third image that is different from the first image and the second image, and provide the second image and the third image to the combiner, wherein the combiner is further configured to output a combined image obtained by combining the first image, the second image, and the third image.

The combiner may include a beam splitter inclined with respect to a traveling direction of light from the light source, the beam splitter transmitting a first part of the light from the light source, reflecting a second part of the light from the light source, and transmitting light of the third image from the display device and a part of the light of the second image; and a concave mirror provided on a traveling path of light passing through the beam splitter from the light source, the concave mirror reflecting the light passing through the beam splitter to direct the reflected light back toward the beam splitter.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
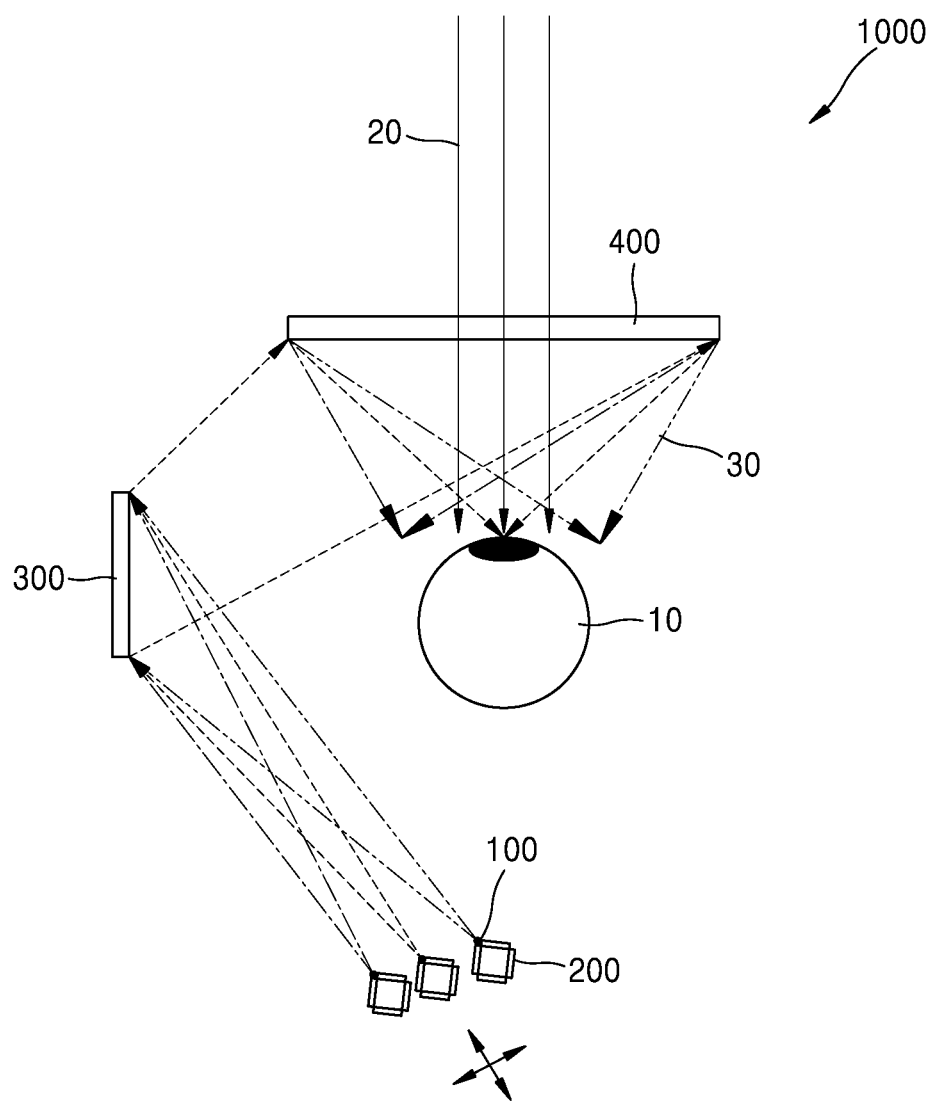
FIG. 1 schematically illustrates an augmented reality (AR) device according to an example embodiment.

Reference will now be made in detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects of the disclosure.

As used herein, the term "and/or" includes any and all combinations of one or more of the associated listed items. Expressions such as "at least one of," when preceding a list of elements, modify the entire list of elements and do not modify the individual elements of the list. For example, the term "at least one of A and B" or "at least one of A or B" may be used to describe that three cases may exist: only A exists, both A and B exist, and only B exists.

Hereinafter, an augmented reality (AR) device according to various example embodiments will be described in detail with reference to the accompanying drawings. The AR device may be implemented in various forms, and is not limited to the example embodiments described herein. Throughout the drawings, like reference numerals refer to like elements, and each element may be exaggerated in size for clarity and convenience of a description.

Terms such as first, second, and the like may be used to describe various elements, but the elements should not be limited to those terms. These terms may be used for the purpose of distinguishing one element from another element. Any references to a singular element may include plural elements unless expressly stated otherwise.

Further, two or more components which will be described later may be integrated into a single component, and a single component which will be explained later may be separated into two or more components. Moreover, each component which will be described may additionally perform some or all of a function executed by another component in addition to the main function thereof. Some or all of the main function of each component which will be explained may be carried out by another component. Each component may be implemented as hardware, software, or a combination of both.

Throughout the entirety of the specification of the disclosure, if it is assumed that a certain part includes a certain component, the term 'including' means that a corresponding component may further include other components unless a specific meaning opposed to the corresponding component is written.

Figure 2:
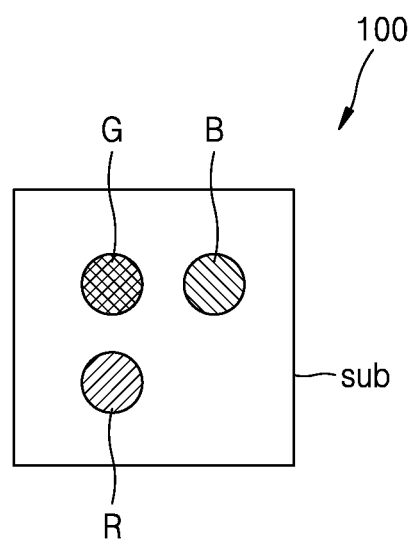
FIG. 2 schematically illustrates an example structure of a light source included in the AR device of FIG. 1 according to an example embodiment.
Figure 3:
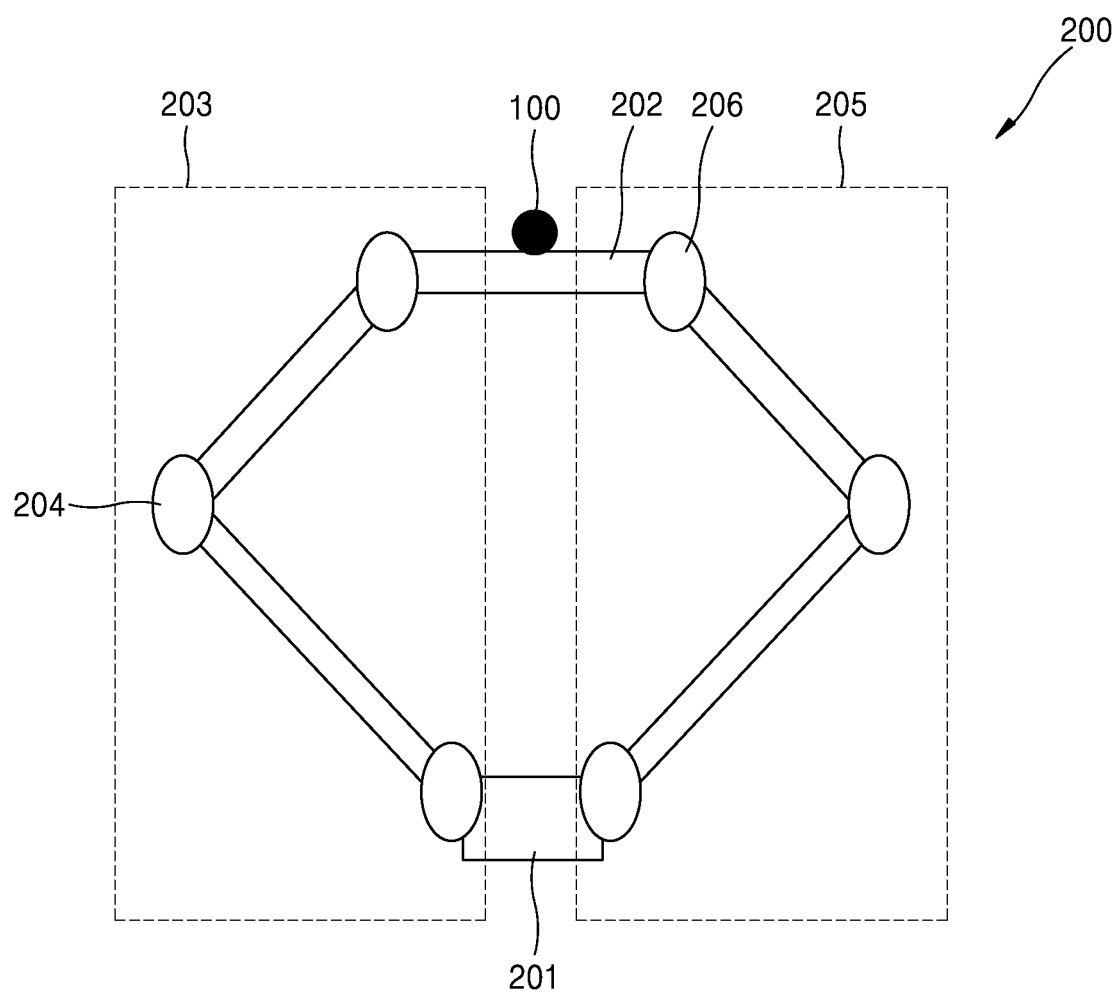
FIG. 3 schematically illustrates an example structure of a light source and a light source-moving delta robot of FIG. 1 according to an example embodiment.
Figure 4:
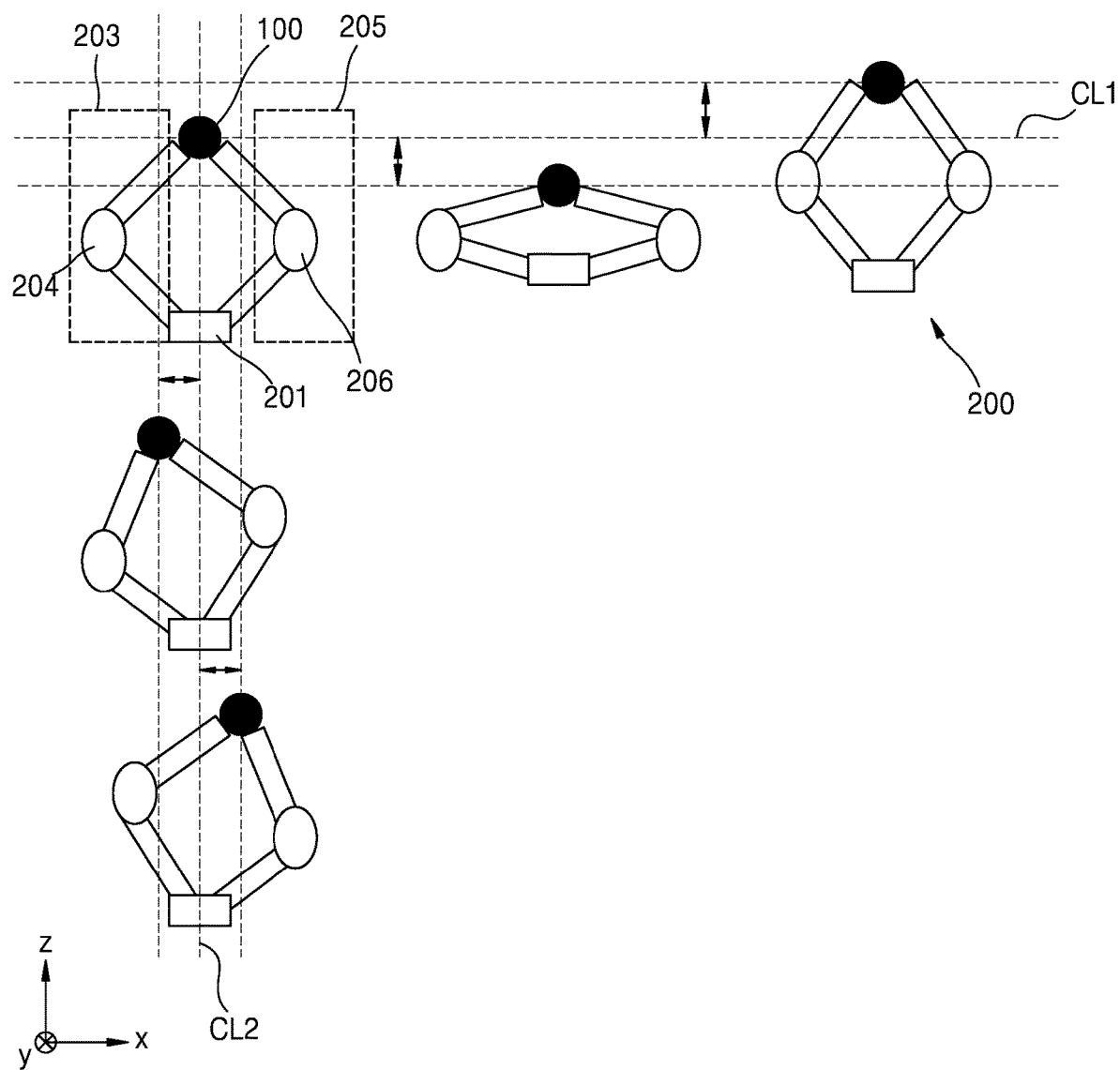
FIG. 4 schematically illustrates an operation of a light source-moving delta robot of FIG. 3 according to an example embodiment.

FIG. 1 schematically illustrates an AR device 1000 according to an example embodiment. FIG. 2 schematically illustrates an example structure of a light source 100 included in the AR device 1000 of FIG. 1 according to an example embodiment. FIG. 3 schematically illustrates an example structure of the light source 100 and a light source-moving delta robot 200 of FIG. 1 according to an example embodiment. FIG. 4 schematically illustrates an operation of the light source-moving delta robot 200 of FIG. 3 according to an example embodiment.

Referring to FIG. 1, the AR device 1000 may include a light source 100, a light source-moving delta robot 200 which has the light source 100 mounted thereon and changes a traveling path of light emitted from the light source 100 by adjusting at least one of a position or a slope of the light source 100 in a three-dimensional (3D) space through three-dimensional movement, a display device 300 which modulates light from the light source 100 to generate a first image, and a combiner 400 which combines the first image from the display device 300 with a second image that is different from the first image from an external source, and delivers a combined image to a user.

The light source 100 may emit monochromatic light of a visible region. For example, the light source 100 may include an optical element (e.g., a light-emitting diode (LED)) which emits any one of red light, green light, or blue light. As illustrated in FIG. 2, the light source 100 may include a plurality of optical elements including a first optical element R emitting red light, a second optical element G emitting green light, and a third optical element B emitting blue light. The plurality of optical elements may be arranged on a substrate sub in a first direction and a second direction crossing the first direction. The first optical element R, the second optical element G, and the third optical element B, which emit light of different wavelengths, included in the light source 100, may be driven independently of one another with time differences among them. Thus, the red light, the green light, and the blue light may be sequentially emitted from the light source 100, and the first image formed by combinations of the red light, the green light, and the blue light may be delivered to a pupil 10 of the user. Each optical element included in the light source 100 may include a laser diode emitting a laser beam. In this case, light emitted from the light source 100 may have coherence.

The light source-moving delta robot 200 has the light source 100 mounted thereon. Thus, the light source 100 may move together with movement of the light source-moving delta robot 200. As described below, an incident angle of light from the light source 100 with respect to the display device 300 may change with three-dimensional movement of the light source-moving delta robot 200.

Referring to FIG. 3, the light source-moving delta robot 200 may include a fixed base 201 and a stage 202 which is spaced vertically apart from the fixed base 201 and has mounted thereon the light source 100. The light source-moving delta robot 200 may include a plurality of first leg portions 203 and a plurality of second leg portions 205 which interconnect the fixed base 201 and the stage 202. The plurality of first and second leg portions 203 and 205 may include at least one first joint portion 204 and at least one second joint portion 206, respectively, to make a joint movement.

The joint movement may mean that members interconnected by the first and second joint portions 204 and 206 move in such a way that an angle relative to each other changes. For example, the plurality of first and second leg portions 203 and 205 may include the first leg portion 203 having a plurality of first joint portions 204 and the second leg portion 205 having a plurality of second joint portions 206. In an example, the first joint portion 204 may be formed between a first end portion of the first leg portion 203 and a first end portion of the stage 202 such that the joint movement may be made between the first leg portion 203 and the stage 202. In another example, the first joint portion 204 may be formed in a middle portion of the first leg portion 203 such that the joint movement may be made in a state where the first leg portion 203 is divided into two regions. In still another example, the first joint portion 204 may be formed between a second end portion of the first leg portion 203 and a first end portion of the fixed base 201 such that the joint movement may be made between the first leg portion 203 and the fixed base 201. The second leg portion 205 may also include the plurality of second joint portions 206 in positions corresponding to the first joint portions 204 of the first leg portion 203 to make the joint movement in a plurality of regions. In this way, through the joint movement made among the fixed base 201, the first leg portion 203, the second leg portion 205, and the stage 202, at least one of a position or a slope of the stage 202 in the three-dimensional space may be adjusted. Moreover, the light source-moving delta robot 200 may further include a third leg portion (not shown) interconnecting the fixed base 201 and the stage 202, and by using a combination of joint movements of the first and second leg portions 203 and 205, and the third leg portion, a change of the position and the slope of the stage 202 in the 3D space may be further diversified.

The light source-moving delta robot 200 may further include a driving portion (not shown) that independently delivers a driving force to each of the plurality of first and second leg portions 203 and 205. The driving force from the driving unit may be delivered to the first joint portions 204 and the second joint portions 206 included in the plurality of first and second leg portions 203 and 205. The driving unit may include a plurality of piezoelectric elements connected to the plurality of first and second leg portions 203 and 205, respectively.

The driving unit may control the first joint portions 204 and the second leg portions 206 such that a moving direction of the first leg portion 203 coincides with a moving direction of the second leg portion 205. For example, the driving unit may apply the same current to each of the plurality of piezoelectric elements included in the driving unit, such that the same driving force may be delivered to the plurality of first and second leg portions 203 and 205. Thus, the plurality of first and second leg portions 203 and 205 may be driven by the same momentum. For example, as shown in FIG. 4, as the plurality of first and second leg portions 203 and 205 are driven by the same momentum, the light source-moving delta robot 200 may make an upward-and-downward (or vertical) vibration movement with respect to a central line CL1 that extends in an x-axis direction. In other words, the light source-moving delta robot 200 may vibrate in a z-axis direction based on repeated vertical movements of the plurality of first and second leg portions 203 and 205, such that coordinates on the z axis of the 3D space of the light source 100 mounted on the light source-moving delta robot 200 may be changed.

The driving unit may control the first joint portions 204 and the second leg portions 206, such that the moving direction of the first leg portion 203 is different from the moving direction of the second leg portion 205. For example, the driving unit may apply different currents to each of the plurality of piezoelectric elements, such that different driving forces may be delivered to the plurality of first and second leg portions 203 and 205. Thus, the plurality of first and second leg portions 203 and 205 may be driven by different momentum. For example, as shown in FIG. 4, as the plurality of first and second leg portions 203 and 205 are driven by different momentum, the light source-moving delta robot 200 may make a horizontal vibration movement with respect to a central line CL2 that extends in the z-axis direction. In other words, the light source-moving delta robot 200 may vibrate in the x-axis direction based on repeated horizontal movements of the plurality of first and second leg portions 203 and 205, such that coordinates of the light source 100 mounted on the light source-moving delta robot 200 on the x axis on the 3D space may be changed. While the stage 202 is omitted in FIG. 4, this illustration is intended for convenience of a description and the stage 202 may be included in the light source-moving delta robot 200. The first leg portion 203 is illustrated as including one first joint portion 204 and the second leg portion 205 is illustrated as including one second joint portion 206, but this illustration is intended for convenience of a description and the disclosure is not limited thereto.

As described above, the light source-moving delta robot 200 may further include a third leg portion (not shown) that is different from the first leg portion 203 and the second leg portion 205. In this case, the driving unit may further include a piezoelectric element connected with the third leg portion. As the light source-moving delta robot 200 vibrates in the z-axis direction and/or the x-axis direction, the light source-moving delta robot 200 may vibrate in the y-axis direction depending on a current applying scheme of the driving unit. Thus, coordinates of the light source 100 mounted on the light source-moving delta robot 200 on the y axis on the 3D space may be changed. Along with movements of the first, second, and third leg portions, coordinates of the light source 100 mounted on the light source-moving delta robot 200 on the x axis, the y axis, and/or the z axis on the 3D space may be changed. Thus, at least one of the position or the slope of the light source 100 on the 3D space is adjusted, such that the traveling path of light emitted from the light source 100 may be changed.

The display device 300 may generate the first image by modulating the light from the light source 100. The first image may be referred to as a virtual image. The display device 300 may be a reflective display device. For example, the display device 300 may include a silicon liquid crystal display (LCoS) or a digital micrometer display (DMD). The display device 300 may include a plurality of pixels. Each pixel of the display device 300 may generate the first image by adjusting the amount of light incident from the light source 100 based on a two-dimensional (2D) image signal from an external source. That is, the light from the light source 100 may be modulated for each pixel in the display device 300.

The combiner 400 may combine the first image generated by the display device 300 with the second image from the external source and provide a combined image to the pupil 10 of the user. The second image may be referred to as a virtual image. That is, the combiner 400 may combine a real image with the virtual image and provide a combined image to the user.

The combiner 400 may include, for example, a holographic optical element (HOE). The HOE may include an interference pattern reproduced by light from the light source 100. For example, the HOE may include a plurality of interference patterns corresponding to light of different incident angles. For example, the light source 100 may be arranged at a first position along with a movement of the light source-moving delta robot 200, such that when light of a first incident angle is incident onto the HOE, a first interference pattern of the HOE may be reproduced to form a virtual image at a first convergence point. For example, the light source 100 may be arranged at a second position that is different from the first position along with a movement of the light source-moving delta robot 200, such that when light of a second incident angle that is different from the first incident angle is incident onto the HOE, a second interference pattern of the HOE, which is different from the first interference pattern, may be reproduced to form a virtual image at a second convergence point. As such, the position or the slope of the light source 100 on the 3D space may be changed along with the movement of the light source-moving delta robot 200, a convergence point may be diversified where the virtual image is formed. In this case, when compared to using a fixed light source, an eye box of the AR device 1000 may be enlarged.

As such, the combiner 400 may provide light 30 of the virtual image to the user, and at the same time, pass light 20 of the real image from the external source therethrough to allow the light 20 to go to the pupil 10 of the user. In this way, the combiner 400 may combine the real image with the virtual image and provide the combined image to the user.

Figure 5:
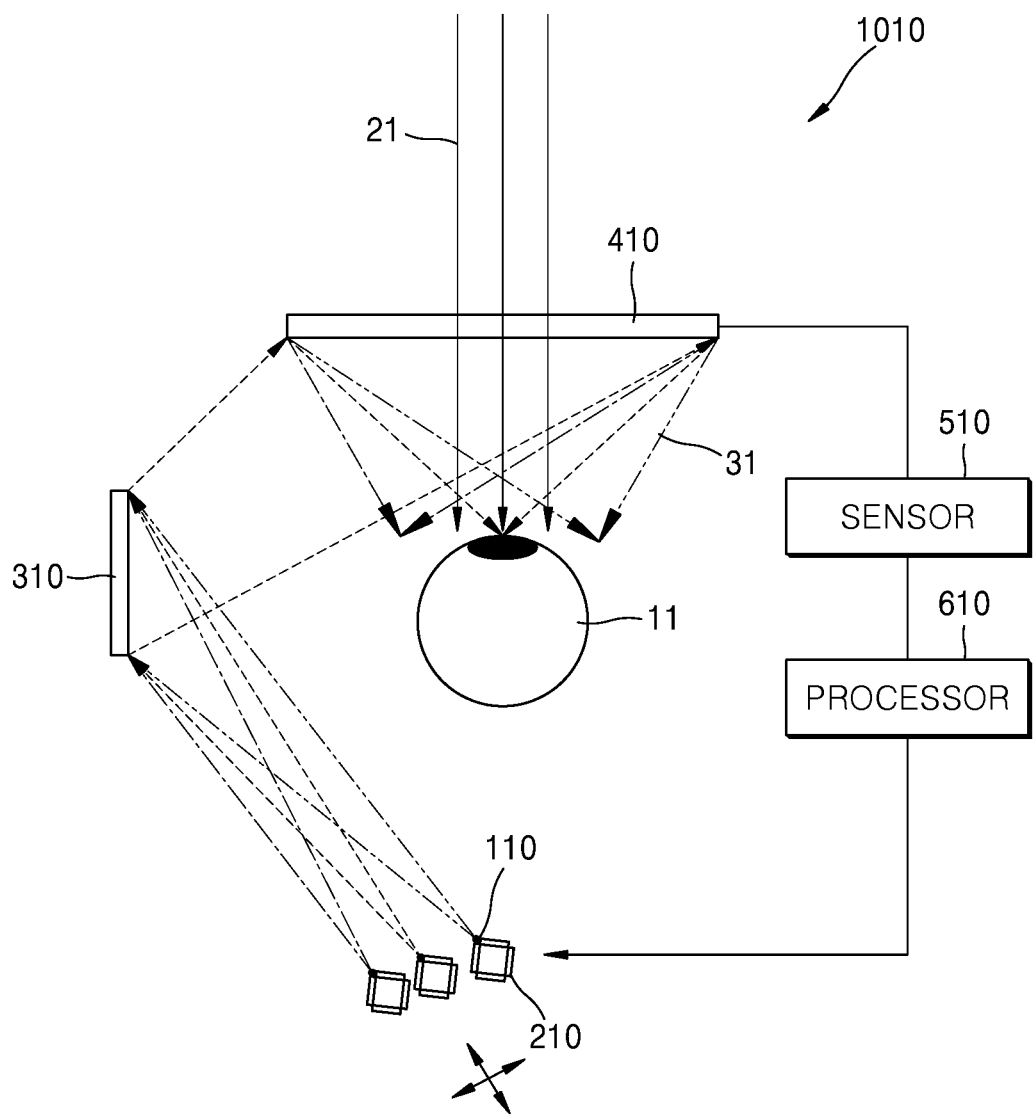
FIG. 5 schematically illustrates a structure of an AR device according to another example embodiment.

FIG. 5 schematically illustrates a structure of an AR device 1010 according to another example embodiment. The structure of the AR device 1010 of FIG. 5 may be substantially the same as that of the AR device 1000 of FIG. 1 except for a sensor 510 and a processor 610. A description will be made with reference to FIG. 5 by avoiding a repeated description made already with reference to FIG. 1.

Referring to FIG. 5, the AR device 1010 may include a light source 110, a light source-moving delta robot 210 having mounted thereon the light source 110 and make a three-dimensional movement, a display device 310 which modulates light from the light source 110 to generate the first image, and a combiner 410 which combines the first image from the display device 310 with the second image that is different from the first image from the external source, and delivers the combined image to the user. The combiner 410 may combine light 21 of the real image from the external source with light 31 of the virtual image, emitted from the light source 110 and modulated by the display device 310, and provide a combined image to a pupil 11 of the user. Moreover, the AR device 1010 may further include a sensor 510 that senses a position of the user's pupil 11. The AR device 1010 may further include a processor 610 that controls driving of the light source-moving delta robot 210 based on information about the position of the pupil 11 sensed by the sensor 510.

For example, the sensor 510 may transmit the information about the position of the pupil 11 of the user to the processor 610. The processor 610 may control driving of the light source-moving delta robot 210 based on the obtained information about the position of the pupil 11 of the user. The processor 610 may control driving of the light source-moving delta robot 210 by controlling a driving unit included in the light source-moving delta robot 210. For example, when the user's pupil 11 is positioned at the first convergence point, the processor 610 may drive the light source-moving delta robot 210 to adjust at least one of the position or the slope of the light source 110, such that the light from the light source 110 is directed toward the first convergence point. For example, when the user's pupil 11 is positioned at the second convergence point that is different from the first convergence point, the processor 610 may drive the light source-moving delta robot 210 to adjust at least one of the position or the slope of the light source 110, such that the light from the light source 110 is directed toward the second convergence point. In this way, by properly adjusting the position of the light source 110 through the movement of the light source-moving delta robot 210 based on the position of the pupil 11, power consumed for generation of the virtual image may be minimized.

The processor 610 may include at least one hardware among a central processing unit (CPU), a microprocessor, a graphic processing unit (GPU), application specific integrated circuits (ASICs), digital signal processors (DSPs), digital signal processing devices (DSPDs), programmable logic devices (PLDs), or field programmable gate arrays (FPGAs), without being limited thereto.

Figure 6:
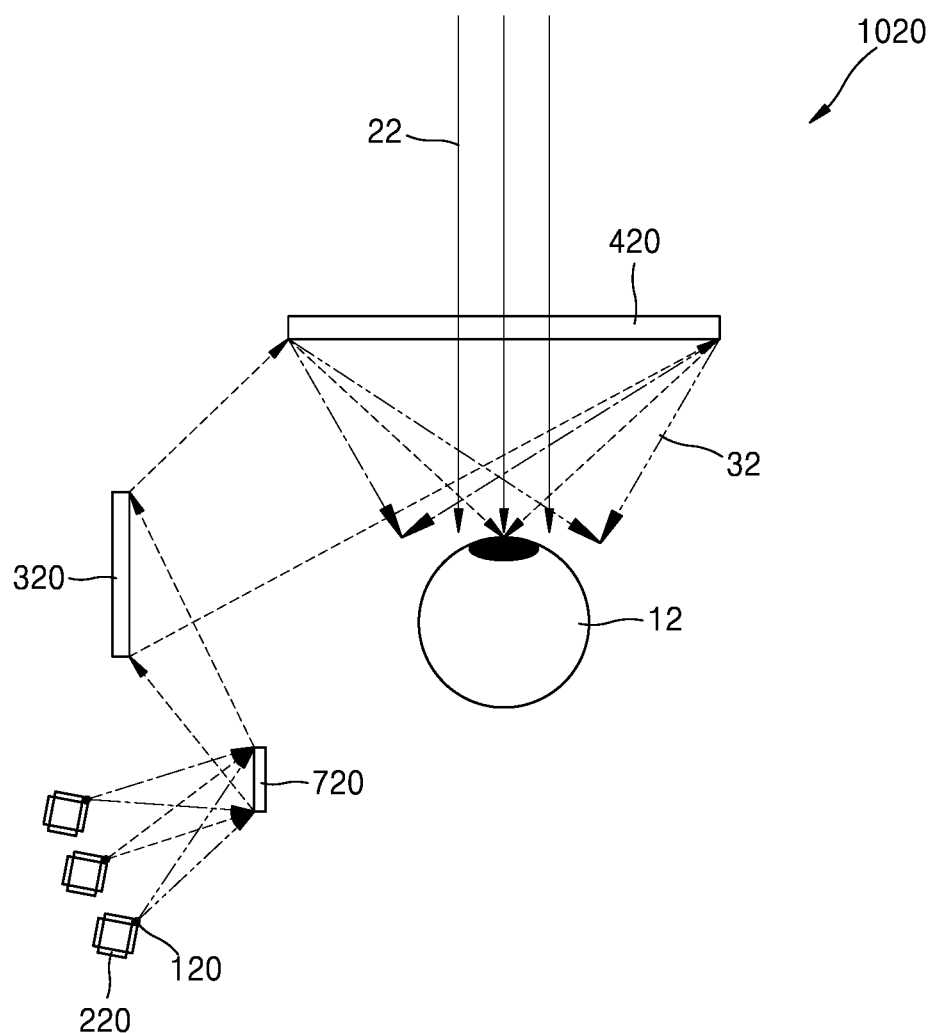
FIG. 6 schematically illustrates a structure of an AR device according to another example embodiment.

FIG. 6 schematically illustrates an AR device 1020 according to still another example embodiment. The structure of the AR device 1020 of FIG. 6 may be substantially the same as that of the AR device 1000 of FIG. 1 except for a reflective mirror 720. A description will be made with reference to FIG. 6 by avoiding a repeated description made already with reference to FIG. 1.

Referring to FIG. 6, the AR device 1020 may include a light source 120, a light source-moving delta robot 220 which is a member having mounted thereon the light source 120 and make a three-dimensional movement, a display device 320 which modulates light from the light source 120 to generate the first image, and a combiner 420 which combines the first image from the display device 320 with the second image that is different from the first image from the external source, and delivers the combined image to the user. The combiner 420 may combine light 22 of the real image from the external source with light 32 of the virtual image, emitted from the light source 120 and modulated by the display device 320, and provide a combined image to a pupil 12 of the user. The AR device 1020 may further include a reflective mirror 720 that is provided between the light source 120 and the display device 320 and causes light from the light source 120 to be incident on the display device 320 by changing a traveling direction of the light. Although not shown in FIG. 6, as described above with reference to FIG. 5, the AR device 1020 may further include a sensor (510 of FIG. 5) that senses the position of the pupil 12 of the user and a processor (610 of FIG. 5) that controls driving of the light source-moving delta robot 210 based on information about the position of the pupil 12 sensed by the sensor 510.

The light from the light source 120 may be incident onto the display device 320 in a state in which a traveling path of the light is changed by being reflected by the reflective mirror 720. Thus, even when the light from the light source 120 is not immediately directed toward the display device 320, the light from the light source 120 may be guided toward the display device 320. Hence, in the AR device 1020 including the reflective mirror 720, relative positions of the display device 320 and the light source 120 with respect to each other may be configured more freely than in an AR device without a reflective mirror.

Figure 7:
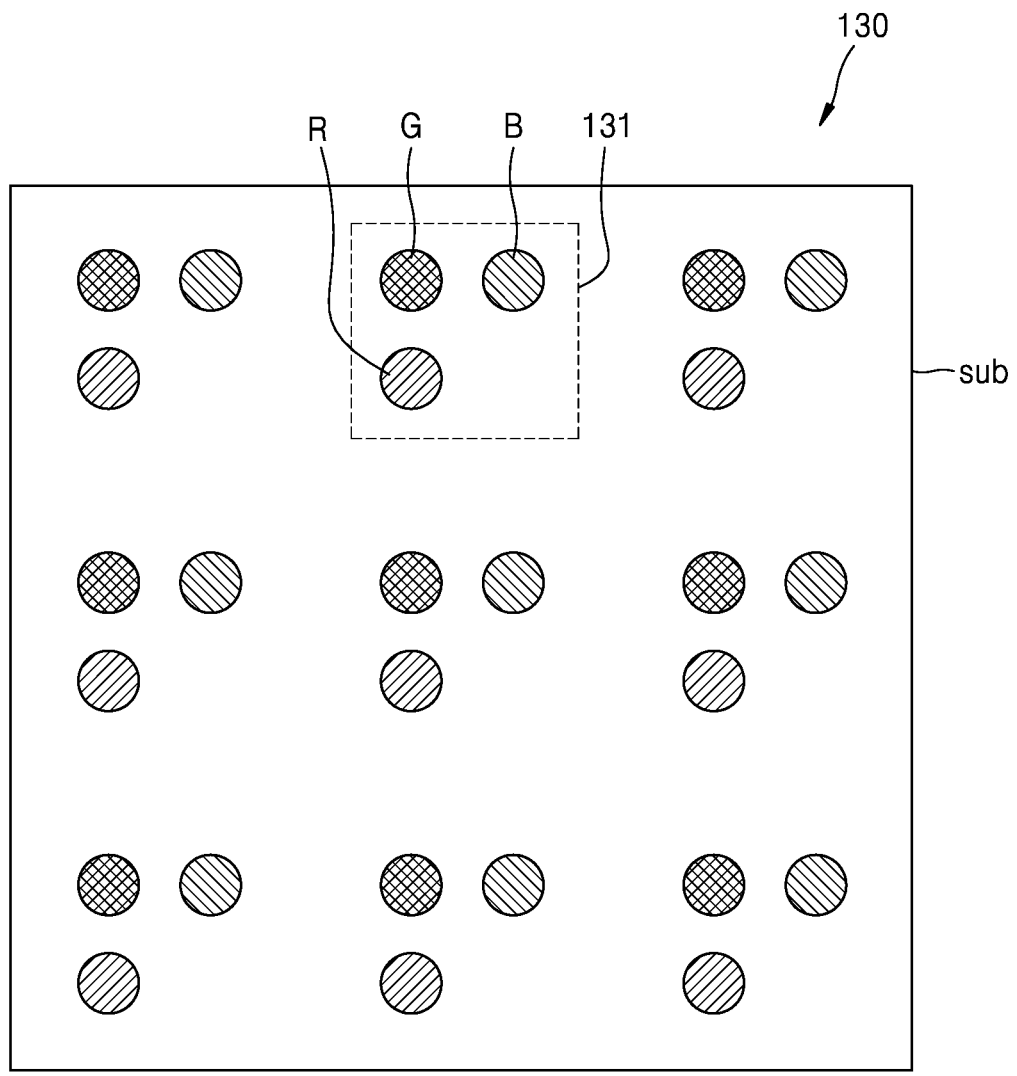
FIG. 7 is a plane view schematically illustrating an example structure of a light source included in the AR device of FIG. 1 according to an example embodiment.

FIG. 7 is a plane view schematically illustrating an example structure of a light source 130 included in the AR device 1000 of FIG. 1.

Referring to FIG. 7, the light source 130 may include an optical element array where a plurality of optical element packages 131 including a plurality of optical elements R, G, and B are arranged in an array form. For example, one optical element package 131 may include a first optical element R emitting red light, a second optical element G emitting green light, and a third optical element B emitting blue light. The plurality of optical element packages 131 may be regularly arranged on a substrate sub in a horizontal direction and a vertical direction. By using the light source 130 including the plurality of optical element packages 131, the eye box of the AR device 1000 may be expanded while minimizing a movement of the light source-moving delta robot (200 of FIG. 1).

The first optical element R, the second optical element G, and the third optical element B, which emit light of different wavelengths, included in each of the optical element packages 131, may be driven independently of one another with time differences among them. Thus, the red light, the green light, and the blue light may be sequentially emitted from the light source 130, and the first image formed by combinations of the red light, the green light, and the blue light may be delivered to the pupil (10 of FIG. 1) of the user.

Figure 8:
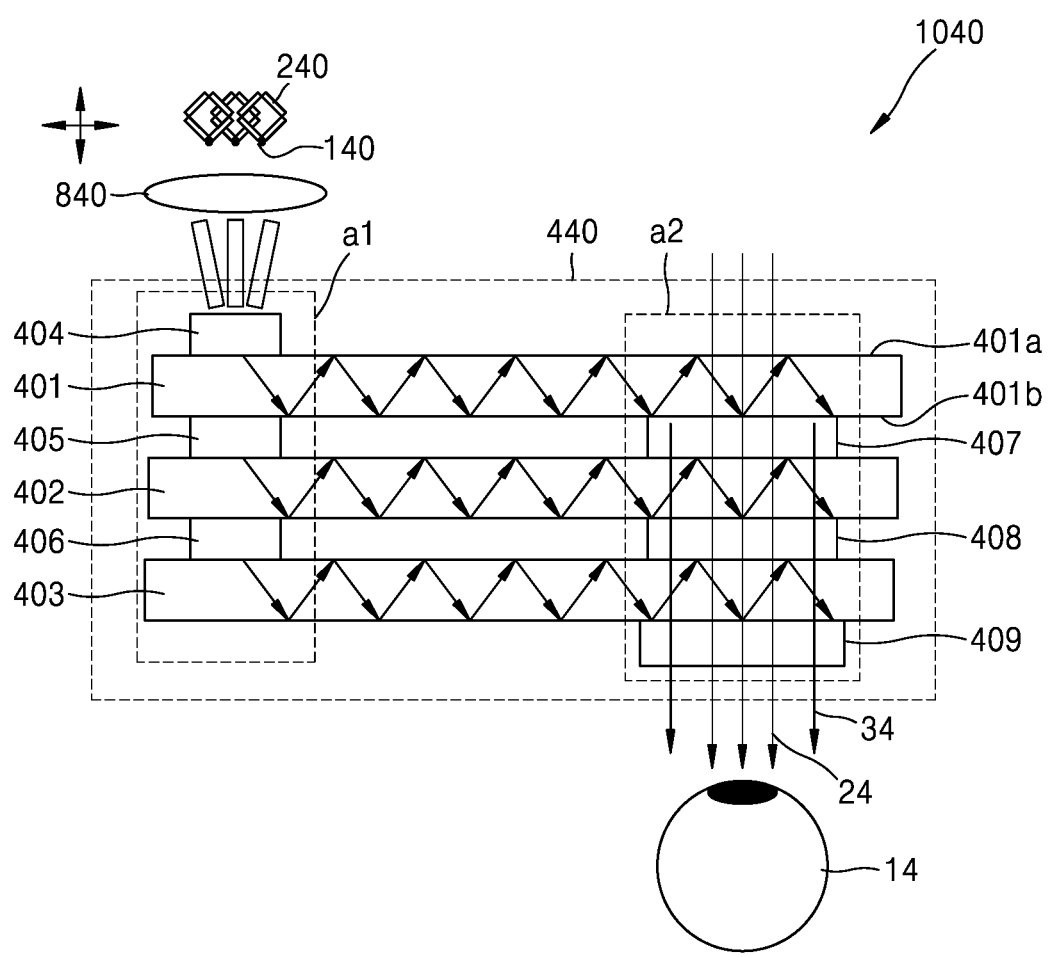
FIG. 8 schematically illustrates a structure of an AR device according to another example embodiment.

FIG. 8 schematically illustrates an AR device 1040 according to still another example embodiment.

Referring to FIG. 8, the AR device 1040 may include a light source 140, a light source-moving delta robot 240 which is a member having mounted thereon the light source 140 and generates the first image by repeatedly adjusting at least one of the position or the slope of the light source 140 in the 3D space through a three-dimensional movement, and a combiner 440 which combines the first image with a second image, which is different from the first image, from an external source and delivers a combined image to the user. Moreover, the AR device 1040 may further include an optical conversion lens 840 that directs the light from the light source 140 toward the combiner 440 by refracting and collimating the light. The optical conversion lens 840 may be provided between the light source 140 and the combiner 440.

The structures of the light source 140 and the light source-moving delta robot 240 may be substantially the same as those of the light source 100 and the light source-moving delta robot 200 of FIG. 1, respectively.

The light source-moving delta robot 240 may be driven at high speeds. Through repeated movements of the light source-moving delta robot 240 based on high-speed driving, light emitted from the light source 140 may form the first image, i.e., the virtual image. For example, the light source-moving delta robot 240 may be driven at high speeds at a frequency of 75 Hz. However, the disclosure is not limited thereto, and the light source-moving delta robot 240 may be driven at high speeds at a frequency higher than 75 Hz. In this way, by generating the virtual image merely with movement of the light source-moving delta robot 240, the AR device 1040 may not include a separate display device to generate the virtual image.

The combiner 440 may include a beam expander which has a first area a1 on which light from the light source 140 is incident and a second area a2 in which the light from the light source 140 is combined with light from an external source and combined light is delivered to the user. By using the beam expander, an irradiating area of light from the light source 140 is expanded. The beam expander may include a plurality of beam expanders that are sequentially arranged in a vertical direction. For example, the beam expander may include a first beam expander, a second beam expander, and a third beam expander that are arranged in the vertical direction, as shown in FIG. 8. However, this is merely for convenience of a description and the number of the beam expander according to the disclosure is not limited thereto.

The first beam expander may include a first light guide plate 401 having a first surface 401a on which light of a first image from the light source 140 is incident and a second surface 401b opposing the first surface 401a, a first input grating 404 which is provided in the first area a1 on the first surface 401a or the second surface 401b and diffracts the light from the light source 140 to travel by being totally reflected inside the first light guide plate 401, and a first output grating 407 which is provided in the second area a2, which is spaced apart from the first area a1 in a horizontal direction of the first light guide plate 401, on the first surface 401a or the second surface 401b, and diffracts and outputs the light traveling inside the first light guide plate 401 by the first input grating 404 in a direction toward the outside of the first light guide plate 401. The first output grating 407 may output the light through the second surface 401b of the first light guide plate 401.

The light source 140 may be arranged on the first area a1 such that the light from the light source 140 is incident onto the first input grating 404. The light arriving at the second area a2 by being totally reflected inside the first light guide plate 401 through diffraction by the first input grating 404 may be output outwardly of the first light guide plate 401 by the first output grating 407. In this case, an area of the first output grating 407 may be greater than that of the first input grating 404. Thus, the light traveling by being totally reflected inside the first light guide plate 401 through diffraction by the first input grating 404 may be output outwardly of the first light guide plate 401 and an irradiation area of light from the light source 140 is enlarged by the first output grating 407.

The second beam expander and the third beam expander may have substantially the same structure as that of the first beam expander. For example, the second beam expander may include a second light guide plate 402, a second input grating 405 provided in the first area a1 of the second light guide plate 402, and a second output grating 408 provided in the second area a2 of the second light guide plate 402. The third beam expander may include a third light guide plate 403, a third input grating 406 provided in the first area a1 of the third light guide plate 403, and a third output grating 409 provided in the second area a2 of the third light guide plate 403. As described above, the first beam expander, the second beam expander, and the third beam expander may be arranged in the vertical direction. Thus, the first input grating 404, the second input grating 405, and the third input grating 406, provided in the first area a1, may be arranged in the vertical direction. The first output grating 407, the second output grating 408, and the third input grating 409, provided in the second area a2, may be arranged in the vertical direction.

The first beam expander may increase an irradiation area of red light from the light source 140. For example, the first input grating 404 and the first output grating 407 included in the first beam expander may be configured to diffract only red light from the light from the light source 140. In this case, blue light and green light may pass through the first light guide plate 401 without being totally reflected inside the first light guide plate 401 included in the first beam expander. The second beam expander may increase an irradiation area of green light from the light source 140. For example, the second input grating 405 and the second output grating 408 included in the second beam expander may be configured to diffract only green light from the light from the light source 140. In this case, red light and blue light may pass through the second light guide plate 402 without being totally reflected inside the second light guide plate 402 included in the second beam expander. Moreover, the third beam expander may increase an irradiation area of blue light from the light source 140. For example, the third input grating 406 and the third output grating 409 included in the third beam expander may be configured to diffract only blue light from the light from the light source 140. In this case, red light and green light may pass through the third light guide plate 403 without being totally reflected inside the third light guide plate 403 included in the third beam expander.

The first output grating 407, the second output grating 408, and the third output grating 409, arranged vertically in the second area a2, may pass light 24 of a real image from an external source therethrough. The light 24 of the real image from the external source may pass through the second area a2 of the first light guide plate 401, the second light guide plate 402, and the third light guide plate 403. Thus, light 34 of a virtual image from the plurality of output gratings 407, 408, and 409 in the second area a2 may be combined with the light 24 of the real image from the external source, which has passed through the second area a2 of the first light guide plate 401, the second light guide plate 402, and the third light guide plate 403, such that combined light may be delivered to a pupil 14 of the user.

The optical conversion lens 840 may be a convex lens. The optical conversion lens 840 may be provided between the light source 140 and the combiner 440. The optical conversion lens 840 may be provided between the light source 140 and the first area a1 of the combiner 440. Light from the light source 140 may be converted by the optical conversion lens 840 and travel to the combiner 440. For example, the light from the light source 140 may be refracted and collimated by the optical conversion lens 840 and travel toward the combiner 440 in the form of parallel light. The light converted by the optical conversion lens 840 may be called Fourier-transformed light. The light that is Fourier-transformed by the optical conversion lens 840 may be incident onto the first area a1 of the combiner 440. For example, the light that is Fourier-transformed by the optical conversion lens 840 may be incident onto the first input grating 404, the second input grating 405, and the third input grating 406.

Figure 9:
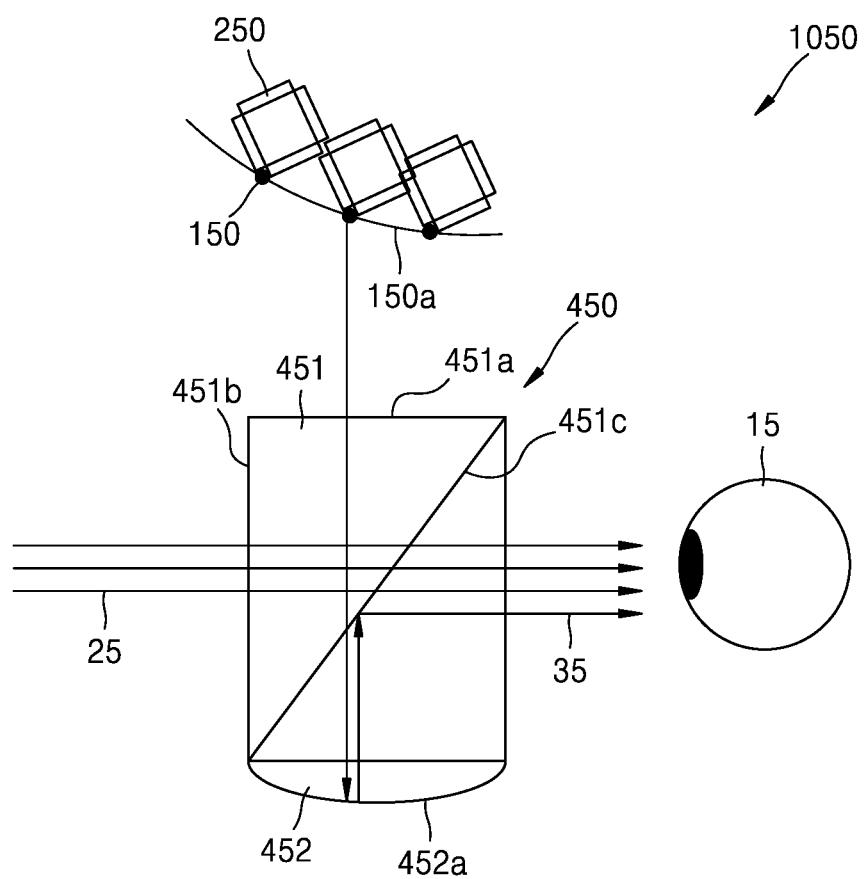
FIG. 9 schematically illustrates a structure of an AR device according to another example embodiment.

FIG. 9 schematically illustrates a structure of an AR device 1050 according to another example embodiment. Referring to FIG. 9, the AR device 1050, like the AR device 1040 of FIG. 8, may include a light source 150, a light source-moving delta robot 250 which is a member having mounted thereon the light source 150 and generates the first image by repeatedly adjusting at least one of the position or the slope of the light source 150 in the 3D space through a three-dimensional movement, and a combiner 450 which combines the first image with a second image, which is different from the first image, from an external source and delivers a combined image to the user. However, the structure of the combiner 450 of the AR device 1050 shown in FIG. 9 is different from that of the combiner 440 of the AR device 1040 of FIG. 8, such that the following description will be made focusing on the combiner 450 with reference to FIG. 9.

Referring to FIG. 9, the combiner 450 may include a beam splitter 451. The beam splitter 451 may include a first incident surface 451a on which light from the light source 150 is incident. Inside the beam splitter 451, a first light-reflecting surface 451c may be provided. The first light-reflecting surface 451c may be inclined with respect to the traveling direction of the light from the light source 150. The first light-reflecting surface 451c may pass therethrough a part of the light incident from the light source 150 through the first incident surface 451a, and reflect another part of the incident light. For example, the first light-reflecting surface 451c may pass therethrough about 50% of the incident light and reflect the other about 50% of the incident light. The combiner 450 may further include an optical unit 452 including a second light-reflecting surface 452a, provided in a lower portion of the beam splitter 451. The light passing through the beam splitter 451 may be incident onto the optical unit 452. The light incident onto the optical unit 452 may be reflected by the second light-reflecting surface 452a and may travel back toward the first light-reflecting surface 451c of the beam splitter 451. A part of the light incident back onto the first light-reflecting surface 451c may be reflected and travel toward a pupil 15 of the user. Another part of the light incident back onto the first light-reflecting surface 451c may pass through the first light-reflecting surface 451c. In this way, the first image may be provided to the user by using the light 35 emitted from the light source 150 and traveling toward the pupil 15 of the user through the combiner 450.

Moreover, the beam splitter 451 may include a second incident surface 451b onto which light of the real image from the external source is incident. The first incident surface 451a and the second incident surface 451b may be perpendicular to each other. The light of the real image incident through the second incident surface 451b from the external source may be incident onto the first light-reflecting surface 451c. The first light-reflecting surface 451c may pass therethrough a part of the light 25 of the real image from the external source and reflect another part of the light 25. For example, the first light-reflecting surface 451c may pass therethrough about 50% of the incident light and reflect the other about 50% of the incident light. The light passing through the first light-reflecting surface 451c, from the light 25 of the real image from the external source, may travel toward the pupil 15 of the user. In this way, the second image may be provided to the user by using the light 25 incident from the external source and traveling toward the pupil 15 of the user through the combiner 450.

As described above, the combiner 450 may combine the light of the first image from the light source 150 with the light of the second image from the external source and deliver the combined light to the user.

The second light-reflecting surface 452a of the optical unit 452 provided in the lower portion of the beam splitter 451 may be a surface having a curve with respect to the traveling direction of the light. For example, the second light-reflecting surface 452a may have a concave surface with respect to the light from the light source 150. Thus, the second light-reflecting surface 452a may function as a concave mirror. In this case, during reflection of the light by the second light-reflecting surface 452a having a curve, distortion may occur due to chromatic aberration in the first image. To correct such distortion, movement of the light source-moving delta robot 250 may be controlled. For example, when the light source-moving delta robot 250 is driven to move along a curved trajectory 150a, distortion of the light from the light source 150 caused by the second light-reflecting surface 452a may be corrected. While it is illustrated in FIG. 9 that the light source-moving delta robot 250 moves along the curved trajectory 150a that is downward convex, the form of the curved trajectory 150a may be various without being limited to the illustration in FIG. 9. For example, the form of the curved trajectory 150a may be upward convex.

Figure 10:
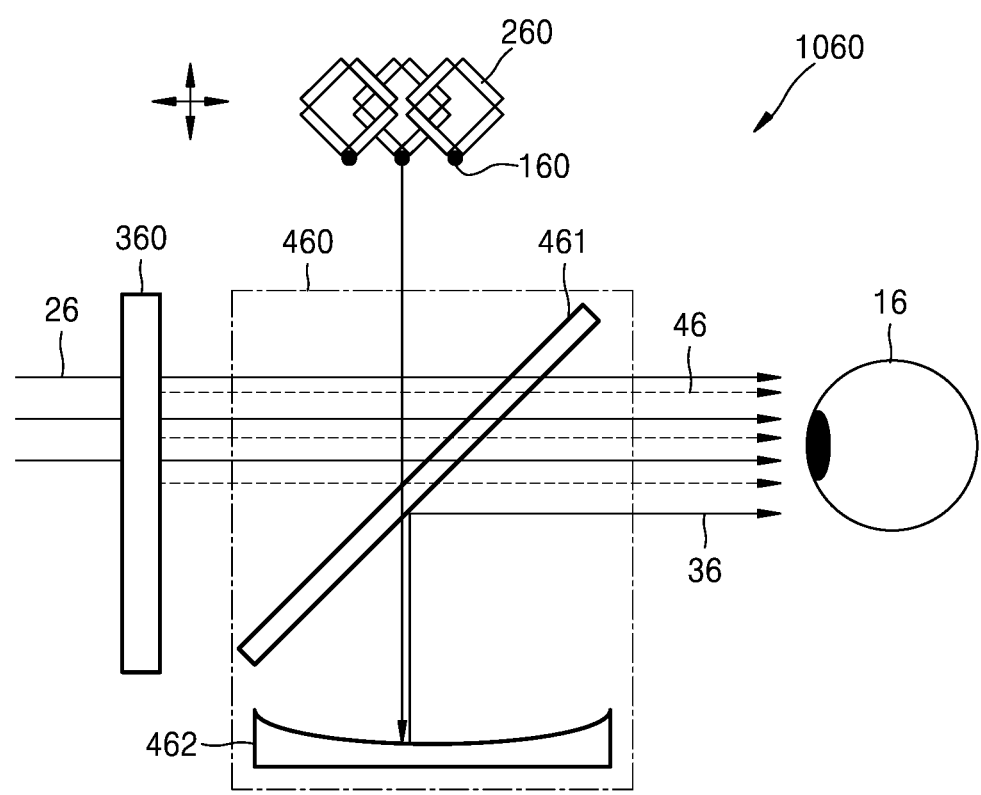
FIG. 10 schematically illustrates a structure of an AR device according to another example embodiment.

FIG. 10 schematically illustrates an AR device 1060 according to still another example embodiment. Referring to FIG. 10, the AR device 1060, like the AR device 1040 of FIG. 8, may include a light source 160, a light source-moving delta robot 260 which is a member having mounted thereon the light source 160 and generates the first image by repeatedly adjusting at least one of the position or the slope of the light source 160 in the 3D space through a three-dimensional movement, and a combiner 460 which combines the first image with a second image, which is different from the first image, from an external source and delivers a combined image to the user. However, the structure of the combiner 460 of the AR device 1060 shown in FIG. 10 is different from that of the combiner 440 of the AR device 1040 of FIG. 8. The AR device 1060 may be different in terms of a structure from the AR device 1040 of FIG. 8 in that the AR device 1060 further includes a display device 360 that generates a third image and delivers the third image to the combiner 440. Thus, the following description will be focused on the combiner 460 and the display device 360.

Referring to FIG. 10, the combiner 460 may include a beam splitter 461. For example, the beam splitter 461 may be a dichroic mirror that passes a part of light therethrough and reflects another part of the light. The beam splitter 461 may be inclined with respect to the traveling direction of the light. The light source 160 may be provided in a first side direction of the beam splitter 461. The beam splitter 461 may pass therethrough a part of light from the light source 160 provided in the first side direction and reflect another part of the light. For example, the beam splitter 461 may pass therethrough about 50% of the incident light and reflect the other about 50% of the incident light. The combiner 460 may further include an optical unit 462 including a reflecting surface, provided in a lower portion of the beam splitter 461. The optical unit 462 may be provided in the lower portion of the beam splitter 461, such that the optical unit 462 may be provided on a traveling path of the light from the light source 160, which has passed through the beam splitter 461. The optical unit 462 may be, for example, a concave mirror. The light which is emitted from the light source 160 and passes through the beam splitter 461 may be incident onto the optical unit 462 provided in the lower portion of the beam splitter 461. The light incident onto the optical unit 462 may be reflected by the reflecting surface of the optical unit 462 and may travel back toward the beam splitter 461. A part of the light incident back onto the beam splitter 461 may be reflected and travel toward a pupil 16 of the user. Another part of the light incident back onto the beam splitter 461 may pass through the beam splitter 461. In this way, the first image may be provided to the user by the light 36 emitted from the light source 160 and traveling toward the pupil 16 of the user through the combiner 460.

Light 26 of the real image from the external source in a second side direction of the combiner 460 may be incident onto the combiner 460. The first side direction and the second side direction may be perpendicular to each other. The light 26 of the real image from the external source, which is incident in the second side direction, may be incident onto the beam splitter 461. The beam splitter 461 may pass therethrough a part of the light 26 of the real image from the external source and reflect another part of the light 26. For example, the beam splitter 461 may pass therethrough about 50% of the incident light and reflect the other about 50% of the incident light. The light passing through the beam splitter 461, from the light 26 of the real image from the external source, may travel toward the pupil 16 of the user. In this way, the second image may be provided to the user by the light 26 incident from the external source and traveling toward the pupil 16 of the user through the combiner 460.

Moreover, the AR device 1060 may further include the display device 360 that is arranged in the second side direction of the combiner 460 and generates the third image that is different from the first and second images and delivers the third image to the combiner 460. For example, the display device 360 may include an organic light emitting diode (OLED). The light of the third image generated by the display device 360 may be incident onto the beam splitter 461. A part of the light of the third image may pass through the beam splitter 461 and travel toward the pupil 16 of the user. The display device 360 may be arranged on the traveling path of the light 26 of the real image from the external source. The display device 360 may pass therethrough the light 26 of the real image from the external source. For example, the display device 360 may include a transparent organic light-emitting device. Thus, light 46 of the third image generated by the display device 360 and the light 26 of the real image from the external source, which has passed through the combiner 460, may be combined, such that the combined light may pass through the beam splitter 461 to travel toward the pupil 16 of the user.

In this way, the light 36 of the first image generated by the light source 160, the light 26 of the second image (or real image) from the external source, and the light 46 of the third image generated by the display device 360 may be combined by the combiner 460, and the combined light may be delivered to the user. In this case, both of the first image and the third image may be virtual images. The first image may be a virtual image generated by high-speed driving of the light source-moving delta robot 260, and may be the virtual image in a high-resolution area among desired virtual images. The third image may be a virtual image generated by the display device 360, and may be the virtual image in a low-resolution area among the desired virtual images. As such, a scheme to generate virtual images of two types having different resolutions and combine the virtual images may be referred to as a Foveated scheme. By using the Foveated scheme, a virtual image of a high display quality may be provided to the user, while reducing a data throughput for generating the virtual image.

Various example embodiments of the disclosure may provide an AR device having an eye box that is enlarged by using a light source-moving delta robot.

Various example embodiments of the disclosure may also provide an AR device including a light source-moving delta robot, which substitutes a display device.

It should be understood that the example embodiments described herein should be considered in a descriptive sense only and not for purposes of limitation. Descriptions of features or aspects within each embodiment should typically be considered as available for other similar features or aspects in other embodiments of the disclosure. While one or more embodiments have been described with reference to the figures, it will be understood by those of ordinary skill in the art that various changes in form and details may be made therein without departing from the spirit and scope as defined by the following claims.

What is claimed is:

1. An augmented reality (AR) device comprising:
   a light source;
   a light source-moving delta robot on which the light source is mounted, the light source-moving delta robot being configured to change a traveling path of light emitted from the light source by adjusting at least one of a position or a slope of the light source in a three-dimensional (3D) space based on a movement of the light source-moving delta robot;
   a display device configured to generate a first image by modulating the light emitted from the light source; and
   a combiner configured to combine the first image generated by the display device with a second image, which is different from the first image and is received from an external source, and output a combined image.

2. The AR device of claim 1, wherein the light source-moving delta robot comprises:
   a fixed base;
   a stage on which the light source is mounted, the stage being spaced apart from the fixed base in a vertical direction;
   a plurality of leg portions interconnecting the fixed base with the stage, each of the plurality of leg portions comprising at least one joint portion configured to execute a joint movement; and
   a driving unit configured to independently provide a driving force to each of the plurality of leg portions.

3. The AR device of claim 2, wherein each of the plurality of leg portions comprises a first leg portion and a second leg portion, the first leg portion comprising at least one first joint portion and the second leg portion comprising at least one second joint portion.

4. The AR device of claim 3, wherein the driving unit is further configured to control the at least one first joint portion and the at least one second joint portion to move in directions different from each other.

5. The AR device of claim 2, wherein the plurality of leg portions comprise at least three leg portions.

6. The AR device of claim 1, further comprising a sensor configured to sense a position of a pupil of a user.

7. The AR device of claim 6, further comprising a processor configured to control driving of the light source-moving delta robot based on information about the position of the pupil of the user, the information being provided by the sensor.

8. The AR device of claim 1, further comprising a reflective mirror provided between the light source and the display device to reflect the light emitted from the light source toward the display device.

9. The AR device of claim 1, wherein the light source comprises an optical element array, in which a plurality of optical element packages are arranged in an array, each of the plurality of optical element packages comprising optical elements.

10. The AR device of claim 1, wherein the combiner comprises a holographic optical element.

11. An augmented reality (AR) device comprising:
    a light source;
    a light source-moving delta robot on which the light source is mounted, the light source-moving delta robot being configured to generate a first image by repeatedly adjusting at least one of a position or a slope of the light source in a three-dimensional (3D) space based on a movement of the light source-moving delta robot; and a combiner configured to combine the first image generated by the light source-moving delta robot with a second image, which is different from the first image and is received from an external source, and output a combined image.

12. The AR device of claim 11, wherein the combiner comprises a beam expander having a first area on which a light from the light source is incident and a second area on which the light from the light source is combined with light from the external source, the beam expander configured to expand an area in which the light from the light source is irradiated.

13. The AR device of claim 12, wherein the beam expander comprises:
a light guide plate comprising a first surface on which the light from the light source is incident, and a second surface opposite the first surface;
an input grating provided in the first area on the first surface or the second surface of the light guide plate, the input grating being configured to diffract the light from the light source to cause the diffracted light to travel by total reflection inside the light guide plate; and
an output grating provided in the second area on the first surface or the second surface of the light guide plate, the output grating being configured to output the light that has travelled inside the light guide plate by the input grating toward an outside of the light guide plate, and the second area being spaced apart from the first area in a horizontal direction of the light guide plate.

14. The AR device of claim 12, wherein the beam expander includes a plurality of beam expanders that are sequentially arranged in a direction.

15. The AR device of claim 12, further comprising an optical conversion lens provided between the light source and the combiner, the optical conversion lens being configured to direct the light from the light source toward the combiner.

16. The AR device of claim 13, wherein the output grating is configured to output the light that has travelled inside the light guide plate through the second surface.

17. The AR device of claim 13, wherein the output grating is configured to transmit light of the second image, based on which the first image is combined with the second image in the second area of the beam expander and the combined image travels through the second surface of the light guide plate.

18. The AR device of claim 11, wherein the combiner comprises:
a beam splitter comprising a first reflecting surface that is inclined with respect to a traveling direction of light from the light source, the first reflecting surface transmitting a first part of the light from the light source and reflecting a second part of the light from the light source; and
an optical unit provided on a traveling path of light passing through the first reflecting surface, the optical unit comprising a second reflecting surface having a curve, and the second reflecting surface reflecting light passing through the beam splitter to direct the reflected light toward the beam splitter.

19. The AR device of claim 18, wherein the light source-moving delta robot is further configured to move along a curved trajectory to correct distortion of the first image caused by the optical unit.

20. The AR device of claim 11, further comprising a display device arranged on a traveling path of light of the second image, the display device being configured to transmit the light of the second image, generate a third image that is different from the first image and the second image, and provide the second image and the third image to the combiner,
wherein the combiner is further configured to output a combined image obtained by combining the first image, the second image, and the third image.

21. The AR device of claim 20, wherein the combiner comprises:
a beam splitter inclined with respect to a traveling direction of light from the light source, the beam splitter transmitting a first part of the light from the light source, reflecting a second part of the light from the light source, and transmitting light of the third image from the display device and a part of the light of the second image; and
a concave mirror provided on a traveling path of light passing through the beam splitter from the light source, the concave mirror reflecting the light passing through the beam splitter to direct the reflected light back toward the beam splitter.

* * * * *